United States Patent [19]

Caray

[11] Patent Number: 4,545,468
[45] Date of Patent: Oct. 8, 1985

[54] TORSION DAMPING ASSEMBLIES FOR CLUTCH DISCS

[75] Inventor: André Caray, Valence, France
[73] Assignee: Valeo, Paris, France
[21] Appl. No.: 501,822
[22] Filed: Jun. 7, 1983

[30] Foreign Application Priority Data

Jun. 8, 1982 [FR] France .............................. 82 09934

[51] Int. Cl.⁴ .............................................. F16D 3/66
[52] U.S. Cl. .............................. 192/106.2; 192/70.18; 464/68
[58] Field of Search .............. 192/106.1, 106.2, 70.17, 192/70.16, 70.13, 70.18; 464/68

[56] References Cited

U.S. PATENT DOCUMENTS

| | | | |
|---|---|---|---|
| 3,118,526 | 1/1964 | Wolfram | 192/70.18 |
| 3,964,586 | 6/1976 | Barrett et al. | 192/106.1 |
| 4,190,142 | 2/1980 | Berlioux | 192/106 |
| 4,223,776 | 9/1980 | Berlioux | 192/106 |
| 4,278,161 | 7/1981 | Mower et al. | 192/106.1 |
| 4,366,893 | 1/1983 | Billet | 192/106 |

FOREIGN PATENT DOCUMENTS

| | | | |
|---|---|---|---|
| 2043374 | 2/1971 | France | |
| 57-51056 | 3/1982 | Japan | 464/68 |

Primary Examiner—Samuel Scott
Assistant Examiner—B. J. Bowman
Attorney, Agent, or Firm—Charles A. Brown; Charles E. Brown

[57] ABSTRACT

A torsion damping assembly, e.g. for a clutch disc, comprises two coaxial parts mounted for relative angular displacement within a predetermined range against the action of circumferentially acting resilient means. One of the coaxial parts comprises a transverse hub flange and the other of the coaxial parts comprises two transverse annular guide members or washers disposed on the respective sides of and spaced axially from the hub flange. The guide members are connected to each other by spaced axial connecting members. At least one strap member also interconnects the annular guide members, a first end of the strap member being fixed at one of the guide members, and a second end of the strap member circumferentially spaced from the first end being fixed to the other of the guide members. The strap member is secured to the other annular guide member by a fastening portion which is circumferentially offset relative to the attachment portion so that the strap member defines bracing for the axial connecting member.

16 Claims, 14 Drawing Figures

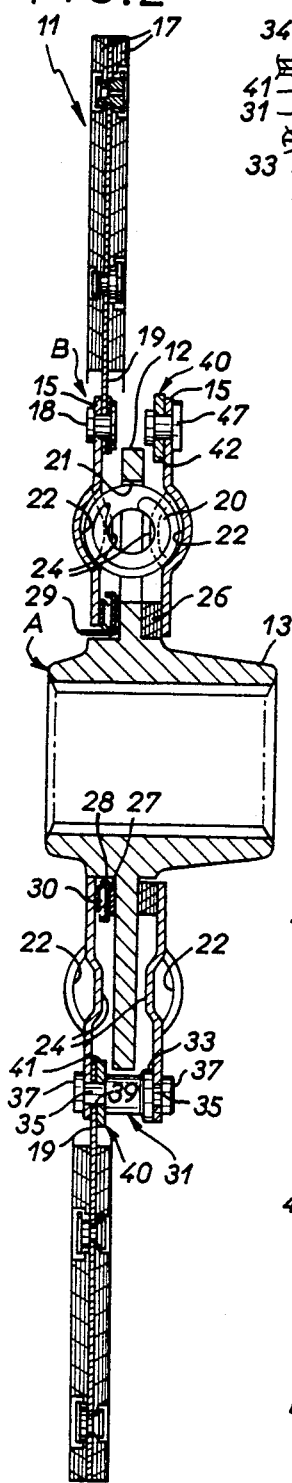

TORSION DAMPING ASSEMBLIES FOR CLUTCH DISCS

BACKGROUND OF THE INVENTION

The present invention relates generally to torsion damping assemblies comprising at least two coaxial parts mounted for relative angular displacement within a predetermined range against the action of chordally oriented resilient means circumferentially acting between the coaxial parts.

The present invention relates more particularly to such torsion damping assemblies comprising one coaxial part defined by a flange called a hub flange and the other coaxial part defined by two annular guide members disposed on the respective sides of the hub flange and spaced axially therefrom. The annular guide members are connected to each other by connecting members arranged parallel to the axis of the torsion damping assembly. The associated resilient means are partly accommodated in openings or windows formed in the hub flange and partly accommodated in openings or windows formed in the annular guide members.

In practice each of the connecting members for securing the annular guide members to each other comprises at each of its ends a neck portion or reduced section, axially beyond a shoulder. The neck portions extend through holes provided in the corresponding annular guide members. The free ends of the neck portions are suitably deformed, like a rivet, by swaging into contact with the corresponding guide members. Thus the connecting members are in effect rigidly fixed in the holes in the annular guide members.

Such a torsion damping assembly may be part of a clutch disc, in which case it is known as a damping hub, for use in automotive friction clutches.

In such a case one of the coaxial parts which is the driving part carries a friction disc having, on both sides along its outer periphery, friction facings by which the friction disc is adapted to be clamped or pressed between two plates fixed for rotation with a first shaft, which in practice is the driving shaft, and the crankshaft in the case of a motor vehicle, and the other coaxial part which is the output or driven part is carried by a hub which is splined for rotation on a second shaft which in practice is the driven shaft and the transmission input shaft in the case of a motor vehicle.

In practice, the connecting members carry all or part of the rotational torque transmitted from the driving shaft to the driven shaft in such a clutch disc.

In the case where the annular guide members are part of the driven part the friction disc is fixed to one of the annular guide members and the input torque is applied to only this annular guide member whereas the output torque is carried by both of the annular guide members.

Consequently, in the course of operation, each connecting member is not only subjected to the shearing force through their neck portions extending through the annular guide member but also an overturning moment with respect to the annular guide members since the transmission of the torque through the guide members is effected differentially. Such an overturning moment, which tends to unseat the neck portions of the connecting members from the holes in the annular guide members in which they are accommodated, may be detrimental to their mechanical securement and therefore to the ultimate service life of the clutch disc, particularly when the torque transmission is high.

BRIEF DESCRIPTION OF THE PRIOR ART

To obviate this drawback it has been proposed, notably in U.S. Pat. Nos. 4,190,142 and 4,223,776, assigned to the assignee of the present application, to provide all the connecting members on a single annular ring. Such a ring is provided at the outer periphery of at least one of the annular guide members beyond the outer periphery of the hub flange therebetween.

Such an arrangement which gives satisfaction but requires two different annular guide members is not suitable in practice for certain types of constructions. For other constructions such as to one to which the present invention particularly relates, it is necessary to provide distinct and separate connecting members because the connecting members must define sufficient clearance with the holes in the hub flange so as not to interfere with the angular displacement of the hub flange relative to the annular guide members.

In U.S. Pat. No. 4,366,893, assigned to the assignee of the present application, it was proposed to resist or oppose the overturning moment to which the connecting members are subjected by joining them together in groups by means of bars. However, as above, this arrangement which is effective and gives satisfaction is suitable for only some types of construction. In addition, the holes in the annular guide members have to be of rectangular section.

BRIEF SUMMARY OF THE INVENTION

According to the invention there is provided a torsion damping assembly, and in particular a clutch disc for an automotive clutch, of the type comprising two coaxial parts mounted for relative angular displacement within a predetermined range against the action of circumferentially acting resilient means. One of the coaxial parts comprises a transverse hub flange and the other of the coaxial parts comprises two transverse annular guide members or washers disposed on the respective sides of and spaced axially from the hub flange. The guide members are connected to each other by spaced axial connecting members. The torsion damping assembly according to the invention is characterized by at least one strap member also interconnecting the annular guide members, a first end of the strap member being fixed to one of the guide members, and a second end of the strap member circumferentially spaced from the first end being fixed to the other of the guide members.

In practice, the strap member extends axially and circumferentially with respect to the axis of the torsion damping assembly rather than substantially only axially as is the case with the axial connecting members.

In any event the strap member secures the annular guide members relative to each other opposing any relative movement therebetween. Therefore the strap members correspondingly reduce the overturning moment to which the axial connecting members are subjected. Such a strap member may, if desired, be provided independently of the axial connecting members, for example, between two of the axial connecting members.

But according to an advantageous feature of the invention such a strap member is associated with one of the axial connecting members. The axial connecting member is in engagement with the strap member by an attachment portion at one end of the connecting member adjacent one of the annular guide members. The strap member is secured to the other annular guide member by a fastening portion which is circumferentially offset relative to the attachment portion so that the strap member defines bracing means for the axial connecting member.

Preferably, such a bracing means is associated with a plurality of axial connecting members.

Owing to their bracing the axial connecting members are better able to resist unseating of their neck portions by the overturning moment to which they are subjected in operation.

Further, it is advantageously possible, in at least some cases, to eliminate, if desired, the annular flange which is usually provided on the axial connecting members to improve their seating. For a negligible increase in cost the torque transmission capacity of the torsion damping assembly is enhanced.

BRIEF DESCRIPTION OF THE DRAWINGS

These and other features and advantages of the invention will be brought out in the description which follows, given by way of example, with reference to the accompanying diagrammatic drawings.

FIG. 2 is a longitudinal sectional view of the clutch disc taken along broken line II—II in FIG. 1;

FIG. 3 is a fragmentary sectional view, shown flat, taken along line III—III in FIG. 1;

FIG. 4 is a perspective view of a strap member shown in FIG. 3, taken on its own;

FIGS. 5 and 6 are views similar to FIG. 3 for two other arrangements of the bracing means;

FIG. 7 is also a view similar to FIG. 3 for a variant of the bracing means;

FIGS. 8–12 are view similar to that of FIG. 4 showing different embodiments of the strap member;

FIG. 13 is a view similar to that of FIG. 3 concerning a further variant of the bracing means according to the invention.

DESCRIPTION OF THE PREFERRED EMBODIMENTS

Figure 1:
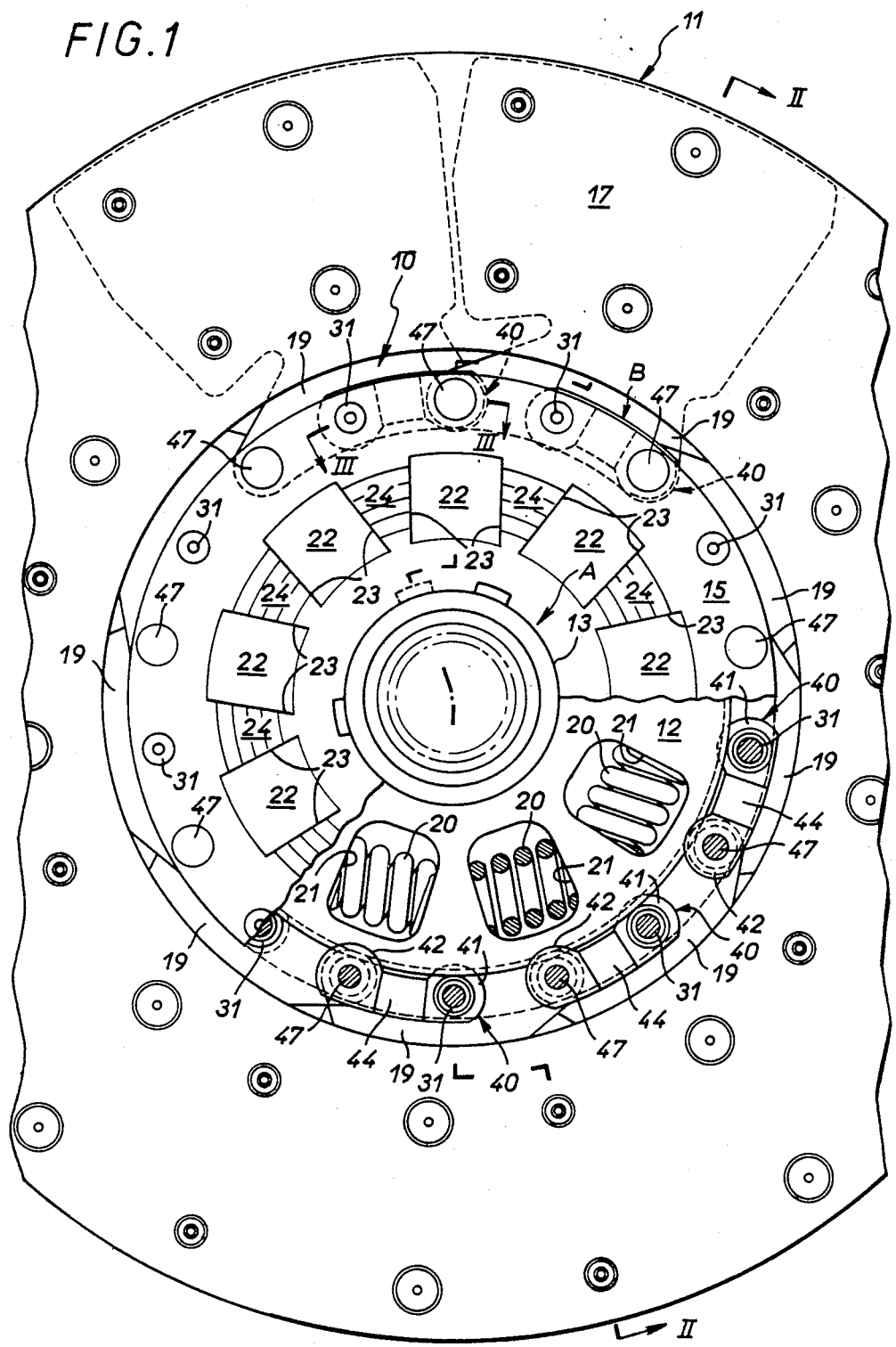
FIG. 1 is a partial elevational view, with parts broken away, of a clutch disc comprising a torsion damping assembly according to the present invention.

The drawings illustrate, by way of preferred example, the application of the torsion damping assembly to a clutch disc having a damping hub. The clutch disc comprises a torsion damping assembly 10 and a friction disc 11.

The torsion damping assembly 10 is in turn comprised of two coaxial parts A, B mounted for relative rotation within a predetermined range of displacement against circumferentially acting resilient means circumferentially interposed between the coaxial parts.

Coaxial part A which is the output or driven part comprises a transverse annular flange 12 which is referred to as the hub flange. In the illustrated embodiment the coaxial part A also comprises a hub 13 which is integral with the hub flange 12 formed at the outer periphery of the hub and intermediate its ends. The hub 13 is adapted to be fixed for rotation with a driven shaft by means of splines.

Coaxial part B, which is the input or driving part, comprises two transverse annular guide members or washers 16 which are disposed on respective sides of the hub flange 12 and axially spaced therefrom. The annular guide members 15 are mounted for rotation relative to the hub 13 and extend annularly therearound. In the illustrated embodiments the annular guide members 15 are advantageously identical to each other.

The friction disc 11 comprises friction facings 17 provided on the respective sides of a support web and extending along the periphery thereof. The friction disc 11 is adapted to be clamped or pressed between the pressure plate and the reaction plate or flywheel which are fixed for rotation with a shaft, in practice the driving shaft. The support web is secured by rivets 18, as shown, to one of the annular guide members 15.

In the illustrated embodiments the support web of the friction disc 11 comprises separate circumferentially spaced blades or leaf spring elements 19. The inner peripheral bases of adjacent blades circumferentially overlap one another.

The circumferentially acting resilient means are circumferentially interposed between coaxial parts A and B in the usual manner. In the illustrated embodiments the resilient means comprise nine chordally oriented springs 22 individually housed partly in windows or openings 21 formed in the hub flange 12 and partly in recesses 22 stamped in the annular guide members 15.

In the illustrated embodiments the recesses 22 are limited circumferentially by radial edges 23 in the annular guide members 15. Alternating with recesses 22, the annular guide members 15 comprise stamped portions 24 which project axially away from the recesses 22. The edges of the stamped portions 24 define circumferentially bearing surfaces for the springs 20.

Between coaxial parts A, B are also provided damping means comprising in the illustrated embodiments a friction washer 26 on one side of the hub flange 12 inserted between the hub flange 12 and the corresponding annular guide member 15 and proximate to the hub 13 and on the other side of the hub flange 12 a friction washer 27 which is in contact with the hub flange 12 and secured to a support washer having axial tabs 29 for fixing it for rotation with the corresponding annular guide member 15.

The friction washers 26 and 27 are both subjected to axially acting resilient means comprising, in the illustrated embodiments, a crinkled or undulated spring washer such as sold under the trademark Onduflex, inserted between the support washer 28 for the corresponding friction washer 27 and the corresponding annular guide member 15.

For fixing the annular guide members 15 for rotation with each other connecting members or pins, herein referred to as axial connecting members 31, connect the annular guide members 15 and spaced locations inside the contour defined by the outer periphery and extend parallel to the axis of the torsion damping assembly. In the illustrated embodiments the axial connecting members 31 are disposed radialy beyond the outer periphery of the hub flange 12. However, this is not necessarily always the case.

In the illustrated embodiments each of the axial connecting members 31 comprises a pin or rivet having an intermediate portion which enlarges into an annular flange 33 at one end and a neck portion 35 of reduced sectional area axially beyond each of shoulders 34. The neck portions 35 extend through holes in the respective annular guide members 15 and are riveted thereto as illustrated at 37 in FIG. 3.

In practice, the axial connecting members 31 are located along the same circumference of the torsion damping assembly as the rivets 18 fixing the blades 19 of the web of the friction disc 11 to one of the annular guide members 15. Accordingly the neck portions 35 of the axial connecting members 31 also traverse the blades 19 through apertures 39 provided for this purpose. Thus the axial connecting members partake in the securement of the web comprising blades 19 to the corresponding annular guide member 15.

According to the invention, in addition to the axial connecting members 31 interconnecting the annular guide members 15 there is provided at least one strap member 40 having a first end fixed to one of the annular guide members 15 and a second end circumferentially spaced from the first end fixed to the other annular guide member 15.

In the illustrated embodiments of FIGS. 1–13 such a strap member 40 is associated with one of the axial connecting members 31. The axial connecting member 31 is in engagement with the strap member 40 by an attachment portion at one end of the axial connecting member adjacent one of the annular guide members. The strap member is secured to the other annular guide member by a fastening portion which is circumferentially offset relative to the attachment portion so that the strap member defines bracing means for the corresponding axial connecting member 31.

In the various embodiments such a strap member 40 is individually associated with at least a plurality of the axial connecting members 31 and preferably each of the axial connecting members.

In the embodiment of FIGS. 1–4, the attachment portion 41 and the fastening portion 42 of the strap member 40 are joined circumferentially by a connecting portion 44 which is generally oblique with respect to the axis of the torsion damping assembly. The connecting portion 44 forms oppositely directed dihedral angles with the axis of the torsion damping assembly. The strap members 40 are formed in one piece from a suitably blanked and folded strip of metal.

The attachment portion 41 forms a lug and has an aperture 45 for receiving one of the neck portions 35 of the associated axial connecting members 31. In conjunction therewith the fastening portion 42 also forms a lug and also has an aperture 46 for receiving a fastener for securement to the annular guide member located on the side of the other neck portion 35 of the same axial connecting member.

In the FIGS. 1–4 embodiment the annular flanges 33 on the axial connecting members 31 are located on the side thereof remote from the blades 19 of the web of the friction disc 11. The attachment portion 41 of the strap member 40 is received on the neck portion 35 of the associated axial connecting member 31 adjacent the blades 19 between the corresponding transverse shoulder 41 of the axial connecting member 31 and the corresponding blade. In conjunction therewith the fastening portion 42 of the strap member 40 is secured to the opposite annular guide member 15 by its own fastener member 47.

As illustrated the fastener member 47 may be a rivet. This rivet is located in line with the rivets 18 securing the blade 19 to the corresponding guide washer 15 through apertures in the guide washer in registration with those provided in the other guide member 15 for rivets 18. As mentioned above, the annular guide members are advantageously of identical configuration. The cross sectional area of each of the neck portions 35 of the axial connecting members 31 is selected to be the same as that of the shank of the rivets 18.

In the embodiments of FIGS. 5–7 the respective annular flange 33 on axial connecting members are disposed on the side of the axial connecting members adjacent and facing the blades 19.

In FIG. 5 the attachment portion 41 of the strap member 40 associated with an axial connecting member 31 is received on neck portion 35 remote from the blades 19 and concomitantly its fastening portion 42 is secured to the annular guide member 15 on the side thereof adjacent the blades 19 by means of one of the rivets 18 which also secures one of the blades 19.

In the modified embodiment of FIG. 6 the attachment portion 41 of the strap member 40 is on the blade side of the corresponding axial connecting member 31 and the fastening portion 42 is fixed to the opposite annular guide member 15 by its own fastener member 47 which in practice is a rivet as above.

Such is likewise the case in the embodiment of FIG. 7 but in addition in this embodiment the strap member 40 comprises two fastening portions 42 disposed on the respective sides of the associated axial connecting member 31. The fastening portions 42 of consecutive strap members 40 overlap and overlie each other and are fixed to the guide member 41 remote from the blades 19 by means of a single fastener member 47, in practice, a rivet.

In the modified embodiments of the straps 40 illustrated in FIGS. 8–10 there are two fastening portions on the respective sides of the associated axial connecting member.

In FIG. 8 each one of the connecting portions 44 of the strap member is transversely cambered (i.e. convex) in one direction proximate to the attachment portion 41 as represented at 49 and transversely cambered in the other direction, i.e. convex, proximate to the corresponding fastening portion 42 as represented at 50. This has the advantage of good rigidification of the strap member.

In the modified embodiment of FIG. 9 the attachment portion 41 forms the bottom of a cup-shaped portion which likewise provides good rigidification of the entire strap member.

In the FIG. 10 embodiment the two fastening portions are joined to each other by a stiffening strip 53 which lies in a plane at right angles to the connection portions 44 and the guide washers 15 and parallel to the axis of the torsion damping assembly.

According to the embodiments of FIGS. 11 and 12 the attachment portion 41 and the fastening portion(s) 42 of a strap member 40 are joined by a circumferential connecting portion 44 which is generally parallel to the axis of the torsion damping assembly and substantially perpendicular to the annular guide members 15.

In the FIG. 11 embodiment there is a single fastening portion 42 and in the FIG. 12 embodiment there are two fastening portions 42.

As illustrated in solid lines in FIG. 13, the strap members 40 associated with their respective axial connecting members 41 are part of a single part 55 disposed annularly around the axis of the torsion damping assembly. According to a further development of this embodiment as schematically illustrated in chain-dotted lines in the same figure all the strap members associated with all the axial connecting members may be part of the same part 55 which may be of closed or open contour.

Figure 14:
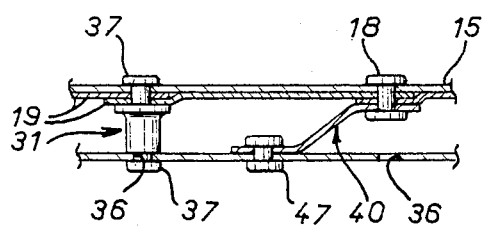
FIG. 14 is yet another view similar to FIG. 3 for another variant of the bracing means according to the invention.

In the FIG. 14 modified embodiment each strap member 40 is independent of the axial connecting member 31 and is disposed, for example, circumferentially between consecutive axial connecting members. In such an arrangement each one of the strap members 40 is then secured at one end to the annular guide member carrying the friction disc 11 for example, by means of one of the corresponding rivets 18, as above, such as illustrated. The other end of the strap member 40 is secured to the other annular guide member 15, for example, by means of a rivet 47, also as above and illustrated in FIG. 14. The ends of the strap member form either an attachment portion or a fastening portion.

In any event, in operation, input rotational torque is applied to the friction disc 11 for transmission to the hub flange 12, the strap members 40 provided according to the invention effectively opposing the overturning moment to which the axial connecting means are subjected.

As is conventional, in operation, and owing to the torque transmitted, coaxial parts A and B are in angular displacement relative to each other against the action of springs 20 until the turns of at least one of the springs come into abutment with one another.

The present torsion damping assembly is of course not limited to the embodiments illustrated and described herein but admits of all variations and alternatives and/or combinations of these and the illustrated and described embodiments, understood to those skilled in the art without departing from the spirit and scope of the invention.

In particular, the axial connecting members need not be of circular cross section, but on the contrary may be flat platelike construction and of rectangular cross section. The corresponding apertures in the annular guide members for receiving the axial connecting means are then also rectangular. Likewise the annular guide members are not necessarily identical.

The field of the invention is not limited to clutch discs. Further, the torsion damping assembly according to the invention does not necessarily have only two coaxial parts mounted for relative angular displacement as above, but may include a greater number of coaxial parts arranged in pairs.

What is claimed is:

1. A torsion damping assembly comprising two coaxial parts mounted for relative angular displacement within a predetermined range against the action of circumferentially acting resilient means, one of said coaxial parts comprising a transverse hub flange and the other of said coaxial parts comprising two transverse annular guide members disposed on the respective sides of and spaced axially from said hub flange, axial connecting members interconnecting said guide members to each other, a strap member also interconnecting said guide members, a first end of said strap member being fixed to one of said guide and a second end of said strap member circumferentially spaced from said first end and fixed to the other of said guide members.

2. The torsion damping assembly according to claim 1, said strap member having an attachment portion at said first end adjacent said one guide member and a fastening portion at said second end, fixed to said other guide member, one of said axial connecting members being in engagement with said attachment portion of said strap, said strap member thereby defining bracing means for the one of said axial connecting members.

3. The torsion damping assembly according to claim 2, wherein said strap member is associated with a plurality of said axial connecting members.

4. The torsion damping assembly according to claim 2, wherein a web of a friction disc is fixed to said other guide member, said fastening portion of said strap member being secured to said one guide member by a fastening means.

5. The torsion damping assembly according to claim 2, wherein a web of a friction disc is fixed to a first of said guide members, said fastening portion of said strap member is fixed to said first guide member by a fastening means securing said web of said friction disc to said first guide member.

6. The torsion damping assembly according to claim 2, wherein said axial connecting member has a portion of reduced section axially beyond a shoulder, said attachment portion having a hole for receiving said reduced section portion of said axial connecting member.

7. The torsion damping assembly according to claim 2, wherein a circumferential connecting portion joins said attachment portion and said fastening portion of said strap member, said circumferential connecting portion being generally oblique relative to the axis of said torsion damping assembly, said attachment and fastening portions respectively forming with said circumferential connecting portion dihedral angles oriented in opposite directions.

8. The torsion damping assembly according to claim 7, wherein the said connecting portion is transversely concave in one way proximate to said attachment portion and transversely concave in the opposite way proximate to said fastening portion.

9. The torsion damping assembly according to claim 1, wherein a circumferential connecting portion joins said attachment portion to said fastening portion, said circumferential connecting portion being generally parallel to the axis of said torsion damping assembly, said attachment and fastening portions extending substantially at right angles to and to the same side of said connecting portion.

10. The torsion damping assembly according to claim 1, wherein said strap member comprises only one fastening portion.

11. The torsion damping assembly according to claim 2, wherein said strap member comprises two said fastening portions disposed on respective circumferential sides of said attachment portion.

12. The torsion damping assembly according to claim 11, wherein said fastening portions are joined to each other by a strip.

13. The torsion damping assembly according to claim 11, wherein said attachment portion of said strap member forms the bottom of a cup-shaped portion.

14. The torsion damping assembly according to claim 2, wherein there are a plurality of said strap members, the fastening portions of adjacent strap members overlapping each other.

15. The torsion damping assembly according to claim 3, wherein there are a plurality of said strap members, said plurality of strap members being part of a single part disposed annularly about the axis of said torsion damping assembly.

16. The torsion damping assembly according to claim 3, wherein there is a said strap member for each of the plurality of said axial connecting members.

* * * * *